(12) United States Patent
Surine et al.

(10) Patent No.: US 6,212,632 B1
(45) Date of Patent: Apr. 3, 2001

(54) METHOD AND SYSTEM FOR EFFICIENTLY REDUCING THE RAM FOOTPRINT OF SOFTWARE EXECUTING ON AN EMBEDDED COMPUTER SYSTEM

(75) Inventors: James W. Surine, San Francisco; Eric Anderson, San Jose, both of CA (US)

(73) Assignee: FlashPoint Technology, Inc., San Jose, CA (US)

( * ) Notice: Subject to any disclaimer, the term of this patent is extended or adjusted under 35 U.S.C. 154(b) by 0 days.

(21) Appl. No.: 09/127,345

(22) Filed: Jul. 31, 1998

(51) Int. Cl.$^7$ ................................................. G06F 9/00
(52) U.S. Cl. ................ 713/2; 713/100; 348/231; 348/232; 348/233; 711/170; 711/171; 711/173
(58) Field of Search ................ 713/2, 100; 348/231, 348/232, 233; 711/170, 171, 173; 707/205

(56) References Cited

U.S. PATENT DOCUMENTS

| | | | |
|---|---|---|---|
| 5,563,655 | 10/1996 | Lathrop | 348/231 |
| 5,583,565 | 12/1996 | Cortjens et al. | 348/15 |
| 5,619,698 | 4/1997 | Lillich et al. | 395/710 |
| 5,734,425 | 3/1998 | Takizawa et al. | 348/231 |
| 5,754,227 | 5/1998 | Fukuoka | 348/232 |
| 5,790,856 | 8/1998 | Lillich | 395/703 |
| 5,794,010 | 8/1998 | Worrell et al. | 395/500.41 |
| 5,794,049 | 8/1998 | Lindholm | 395/706 |
| 5,809,345 | * 9/1998 | Numako | 396/48 |
| 5,867,681 | 2/1999 | Worrell et al. | 712/208 |
| 5,926,208 | * 7/1999 | Noonen et al. | 348/17 |
| 5,938,766 | 8/1999 | Anderson et al. | 713/100 |
| 6,115,799 | 9/2000 | Ogawa | 711/171 |

* cited by examiner

Primary Examiner—Kevin J. Teska
Assistant Examiner—William D. Thomson
(74) Attorney, Agent, or Firm—Sawyer Law Group LLP

(57) ABSTRACT

A method and system for efficiently managing the contents of a volatile memory and a non volatile memory used by an embedded computer system in order to reduce the amount of volatile memory required by the embedded computer system for operation. The embedded computer system includes a processor coupled to the volatile and non-volatile memories via a bus. The volatile and non volatile memories store computer readable software for execution by the embedded computer system. When executed, the software causes the embedded computer system to implement the method for efficiently managing the contents of the volatile and non-volatile memories. At power-up, boot code stored in the non-volatile memory is executed and begins instantiating the initial operating environment of the embedded computer system. A function pointer table is instantiated in the volatile memory, wherein the function pointer table includes a plurality of entries for a corresponding plurality of instantiated functions, wherein at least one entry is for operating system code stored in the non-volatile memory. At least one high-use function is decompressed out of the non-volatile memory and instantiated in volatile memory. The function pointer table is updated using a patch manager to incorporate an entry for the high-use function(s). The operating system code is executed from the non-volatile memory while the high-use function is executed from the volatile memory. In so doing, an amount of volatile memory required by the embedded computer system is reduced while retaining a speed benefit conferred by executing software from the volatile memory.

27 Claims, 11 Drawing Sheets

METHOD AND SYSTEM FOR EFFICIENTLY REDUCING THE RAM FOOTPRINT OF SOFTWARE EXECUTING ON AN EMBEDDED COMPUTER SYSTEM

FIELD OF THE INVENTION

The field of the present invention pertains to devices having embedded digital computer systems. A digital image capture device is one example of such a system. More particularly, the present invention relates to a method and system for efficiently managing and executing software for an embedded computer system of a device.

BACKGROUND OF THE INVENTION

Many consumer electronic devices common to everyday use derive much of their utility from the manner in which they interact with users and the manner in which they implement their function. Users have become quite accustomed to intelligent devices and machines and their ease of use and functionality. Increasingly, an embedded digital processing system underlies this ease of use and functional capability. These systems are referred to as embedded because, unlike a discreet, stand-alone digital processing system (e.g., a personal computer), they are usually dedicated to a specific set of related functions as opposed to being general purpose. An embedded digital processing system of a device executes software code designed specifically for implementing the functionality of the device.

An embedded digital processing system (hereinafter embedded system) is usually considered an integral part of the device in which it is included. Within more complex devices, there may be a very powerful embedded system, capable of executing many of millions of instructions per second. A modern digital camera is one example of such a device.

A typical modern digital camera is very similar in size and behavior to conventional point-and-shoot cameras. The digital camera usually includes an imaging device, user interface displays, mode control indicators, and the like, which are controlled by an embedded system running a software program. When an image is captured, the imaging device is exposed to light and generates raw image data representing the image, the embedded system compresses the image, and the image is stored in memory for archiving or later review: The digital camera supports many different functions and many different operating modes for capturing images, reviewing images, and the like. Each of these functions and modes is implemented by the specialized hardware of the digital camera and specific specialized software functions executing on the digital camera's embedded system.

Prior Art FIG. 1 shows a typical embedded system 100. Embedded system 100 includes a processor 101, a RAM (random access memory) 102, an I/O (input-output) unit 103, a ROM (read only memory) 104, controlled equipment 105, and a removable memory 106, each respectively coupled via a bus 110.

The functionality and operating characteristics of embedded system 100 are largely determined by processor 101 and controlled equipment 105, as processor 101 executes software stored in ROM 104 and RAM 102 and controls the operation of controlled equipment 105. For example, in the case of a digital camera, controlled equipment 105 would include a digital imaging device, mode control indicators, user interface displays, and the like.

Referring now to Prior Art FIG. 2, a memory diagram of the software contents of ROM 104 and RAM 102 is shown. Typically, as shown in FIG. 2, the camera system code 203 (e.g., operating system software and its associated data structures, resources, etc.) is stored as compressed code 201 in non-volatile ROM 104. At boot time, or power-up, boot code 202 executes, decompresses compressed code 201 into camera system code 203 and loads camera system code 203 into RAM 102. Boot code 202 also sets up and initializes working memory area 204, buffers 205 (e.g., typically comprising a display buffer and a draw buffer), and a capture buffer 206.

Most digital cameras execute their operating system software from ROM. This provides the advantage of conserving the amount of RAM needed for nominal functionality. However, for speed and responsiveness reasons, the more performance-oriented digital cameras are configured to run their operating system software (e.g., camera system code 203) from RAM 102 as opposed to ROM 104. This is due to the fact that RAM (e.g., SDRAM, DRAM, EDO RAM) is much faster than ROM or EEPROM. RAM, however, is volatile, and therefore does not maintain its contents after power-off. Consequently, these digital cameras and other performance-oriented types of embedded system consumer electronic devices transfer a compressed image of their system code from a non-volatile ROM to a faster RAM at power up. The system code then executes from RAM.

There is a problem, however, in the fact that, while faster, RAM is more expensive than ROM. As modern consumer electronics devices increase in functionality and sophistication, even the most inexpensive device will include one or more embedded systems to enhance the interface with the user or to accomplish more elaborate functions. Hence, it becomes important to reduce the cost of these embedded systems as much as possible.

Thus, what is required is a method and system for implementing complex functionality in a consumer electronics device as inexpensively as possible. What is needed is a system which reduces the amount of expensive RAM needed in the embedded system of a device. The required system should maintain the speed and responsiveness while reducing the amount of RAM used in the device. The present invention provides a novel solution to the above requirements.

SUMMARY OF THE INVENTION

The present invention provides a method and system for implementing complex functionality in a consumer electronics device inexpensively. The present invention provides a system which reduces the amount of expensive RAM needed in the embedded system of a device. Additionally, the system of the present invention maintains the speed and responsiveness of the device while reducing the amount of RAM used in the device. In comparison to prior art embedded system devices, a device in accordance with the present invention either uses less RAM and is thus less expensive, or runs faster using the same amount of RAM.

In one embodiment, the method of the present invention efficiently manages the contents of a volatile RAM and a non volatile ROM used by an embedded system in order to reduce the amount of RAM required by the embedded system for operation. The embedded system includes a processor coupled to the RAM and ROM via a bus. The RAM and ROM both store computer readable software for execution by the embedded system. When executed, the software causes the embedded system to implement the method of the present invention.

At power-up, boot code stored in the ROM is executed and begins instantiating the initial operating environment of the embedded system. A function pointer table is instantiated in the RAM. The function pointer table has entries, or function pointers, for each instantiated function such that they can each call each other and pass execution. The function pointer table has entries for functions which are instantiated in ROM and entries for functions which are instantiated in RAM. In accordance with the present invention, a set of high-use functions are decompressed out of ROM and instantiated in RAM using a patch manager. The high-use functions comprise those functions which account for a disproportionately high amount of processor execution time and are typically a small subset of code in comparison to the aggregate code of the embedded system. The present invention utilizes this characteristic advantageously by instantiating these functions in the much faster RAM. The patch manager subsequently updates the function pointer table to incorporate an entry for the high-use functions, thereby linking the high-use functions with the rest of the instantiated functions. The operating system code is then executed from the ROM while the high-use functions are executed from the RAM. In so doing, an amount of RAM required by the embedded system is reduced while retaining a speed benefit conferred by executing software from the RAM.

In an alternate embodiment of the present invention, the address space of the embedded system's RAM is dynamically allocated by a memory configuration manager to functions on an as-needed basis. In this embodiment, in addition to instantiating certain high-use functions, a memory configuration manager decompresses new software functions out of ROM, instantiates them in RAM, and updates the function pointer table to link them dynamically, as the capability of the new software functions are needed. Thus, for example, as the embedded computer system changes modes, functions for the new mode are loaded into RAM over the functions for the old mode. This dynamic allocation provides an even more efficient utilization of valuable RAM space.

BRIEF DESCRIPTION OF THE DRAWINGS

The present invention is illustrated by way of example and not by way of limitation, in the figures of the accompanying drawings in which like reference numerals refer to similar elements and in which.

Prior Art

Prior Art

DETAILED DESCRIPTION OF THE INVENTION

In the following detailed description of the present invention, numerous specific details are set forth in order to enable one of ordinary skill in the art to make and use the invention and is provided in the context of a patent application and its requirements. Although the present invention will be described in the context of a digital camera, various modifications to the present embodiment will readily be apparent to those skilled in the art and the generic principles herein may be applied to other embodiments. That is, any embedded computer system device, such as, for example, a personal digital assistant (PDA) or an embedded digital communications device, that uses both ROM and RAM, could incorporate the features described below herein and that device would be within the spirit and scope of the present invention. Thus, the present invention is not intended to be limited to the embodiment shown but is to be accorded the widest scope consistent with the principles and features described herein.

The present invention provides a method and system for implementing complex functionality in a consumer electronics device inexpensively. The present invention provides a system which reduces the amount of expensive RAM needed in the embedded system of a device. Additionally, the system of the present invention maintains the speed and responsiveness of the device while reducing the amount of RAM used in the device. In comparison to prior art embedded system devices, a device in accordance with the present invention either uses less RAM and is thus less expensive, or runs faster using the same amount of RAM.

Figure 1:
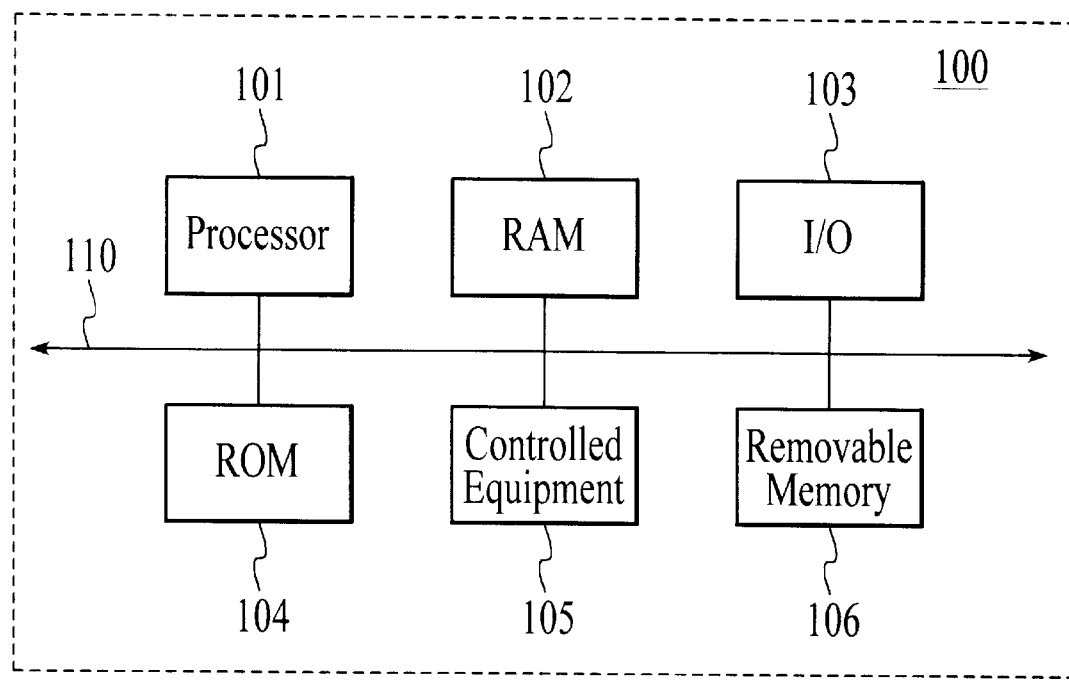
FIG. 1 shows a typical prior art embedded system.
Figure 2:
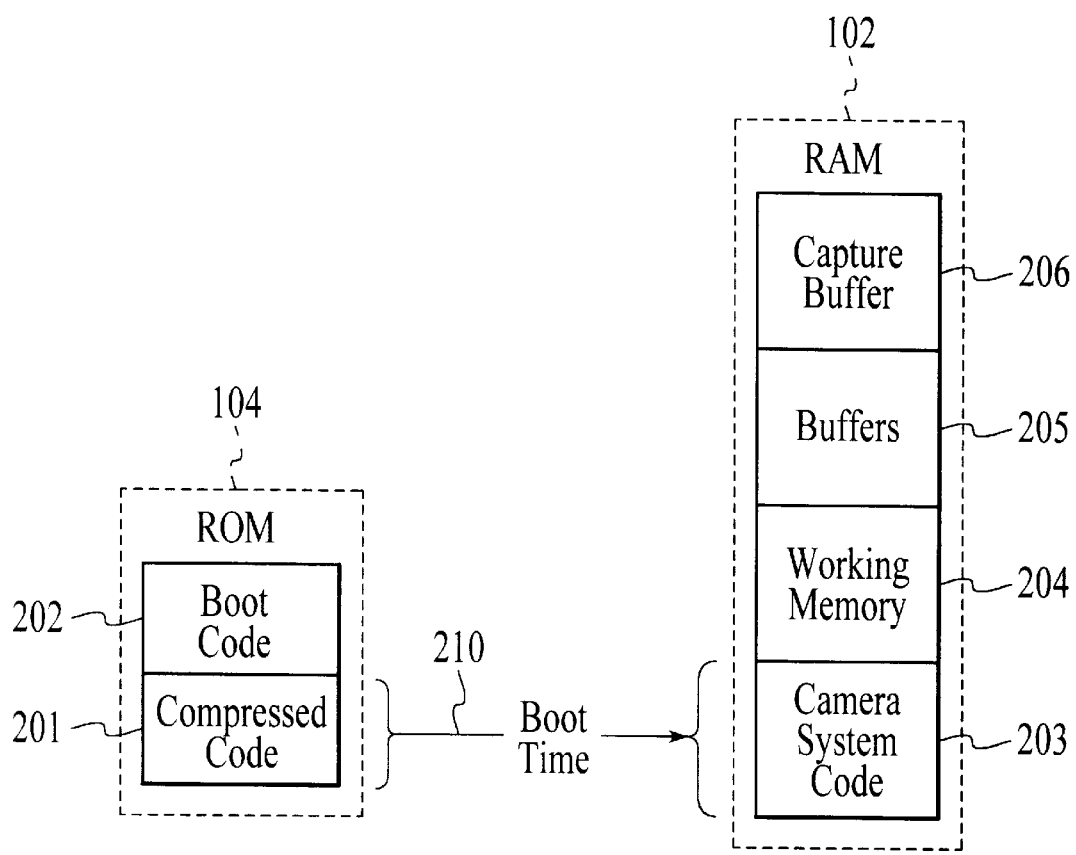
FIG. 2 shows a memory diagram of the software contents of a ROM and a RAM of the embedded computer system of Prior Art FIG. 1.
Figure 3:
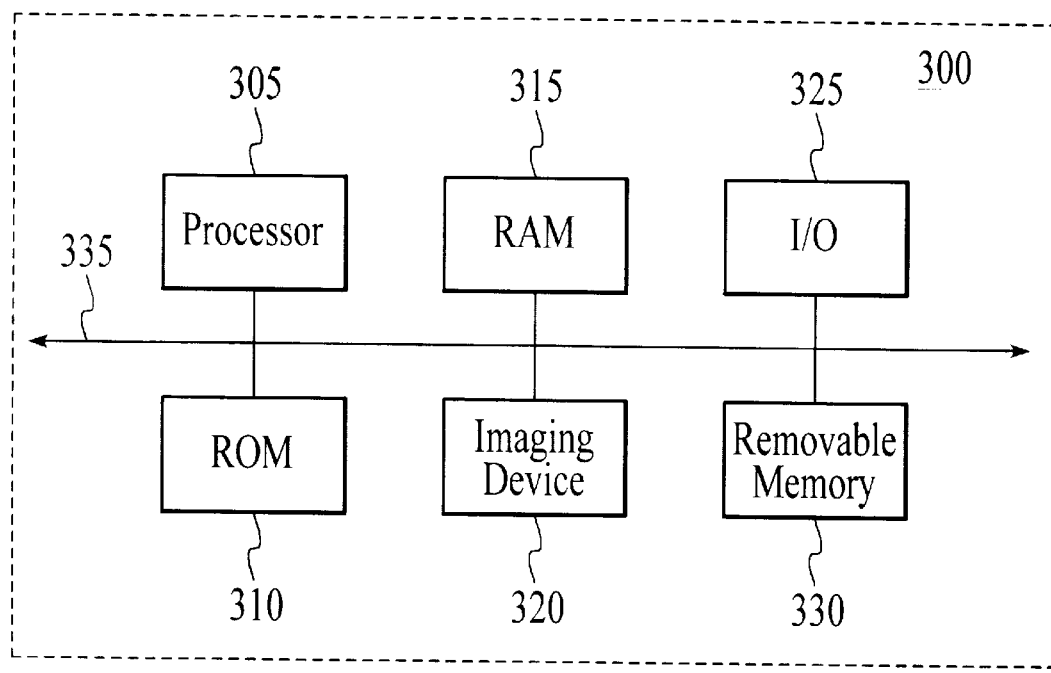
FIG. 3 shows an embedded system of a digital camera in accordance with one embodiment of the present invention.

Referring to FIG. 3, an embedded system 300 is shown. Embedded system 300 includes a processor 305, a RAM 315, an I/O device 325, a ROM 310, an imaging device 320, and a removable memory 330, each respectively coupled via a bus 335. In the present embodiment, embedded system 300 is included within a digital camera. However, it should be appreciated that the method and system of the present invention can alternatively be implemented in other types of devices having embedded systems, including, for example, portable consumer electronics products as well as custom industrial systems.

The functionality and operating characteristics of embedded system 300 are largely determined by processor 305 and imaging device 320, as processor 305 executes software stored in ROM 310 and RAM 315, and controls the operation of imaging device 320. In accordance with the present invention, ROM 310 stores the operating system code, boot code, and the like of system 300, and in the present embodiment has a capacity of approximately 2 megabytes (MB). RAM 315 provides working memory for use by processor 305, buffers for storing images captured by imaging device 320, and the like, and in the present embodiment has a capacity of approximately 4 MB. I/O device 325 provides user input, typically via mechanisms such as a shutter button or a program selection button, which allows new program code to be loaded from an external computer, and the like. Imaging device 320 captures optical images by converting them into digital data. Removable memory 330 provides storage for captured images and an alternate method of introducing new code (such as, for example, program extensions) to the system. Processing unit 305 controls and coordinates the interaction of ROM 310, RAM 315, imaging device 320, I/O device 325, and removable memory 330, by executing the software code which is stored in ROM 310 and RAM 315. In the present embodiment, processing unit 305 is a PowerPC family microprocessor.

Figure 4:
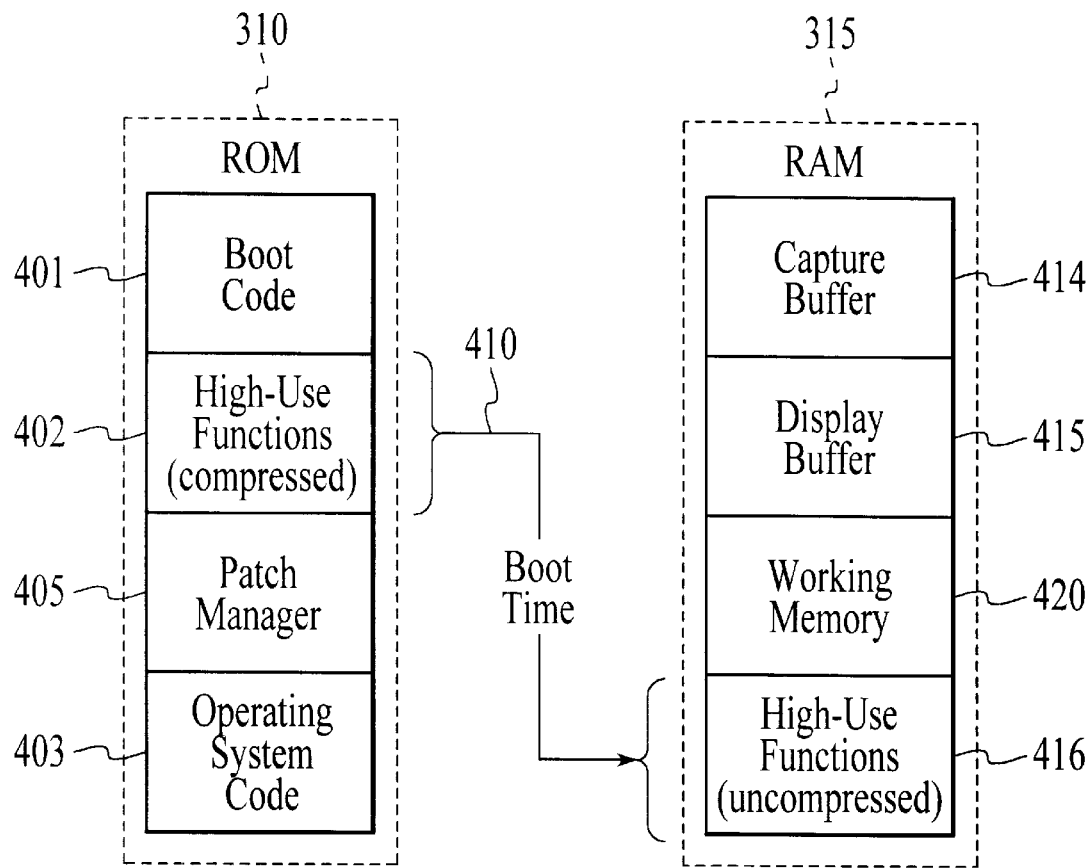
FIG. 4 shows a memory diagram depicting the contents of a ROM and a RAM of the embedded system of FIG. 3.

Referring now to FIG. 4, a memory diagram depicting the contents of ROM 310 and RAM 315 is shown. As shown in FIG. 4, ROM 310 stores software including boot code 401, compressed high-use functions 402, and operating system code 403. FIG. 4 also shows the software contents of RAM 315 during capture mode from a time shortly after initial power up of system 300. RAM 315 includes a capture buffer 414, a display buffer 415, uncompressed high-use functions 416, and a working memory space 420.

In accordance with the present invention, the size of RAM 315 is minimized by running the majority of the software of embedded system 300 (e.g., boot code 401 and operating system code 403) from ROM 310. However, the overall speed of system 300 is largely maintained by running the most frequently-used software (e.g., high-use functions 416) from RAM 315.

At system 300 power-up, boot code 401 is executed and begins setting up the initial software environment of embedded system 300. Boot code 401 initializes the initial software environment of system 300 by setting up capture buffer 414, display buffer 415, and working memory 420. Patch manager 405 subsequently executes. Patch manager 405 includes decompression software which decompresses compressed high-use functions 402 and, as described in greater detail in the discussion of FIG. 5 below, loads the resulting decompressed high-use functions 416 into RAM 315. This is shown by arrow 410. Write address space (e.g., capture buffer 414, display buffer 415, and working memory 420) are then instantiated in RAM 315. Operating system code 403 and patch manager 405 are instantiated in ROM 310. The rest of the operating system code (e.g., operating system code 403) remains instantiated in ROM 310.

In so doing, the present invention advantageously utilizes a common characteristic of computer software in that, in most cases, a processor (e.g., processor 305) spends a majority of its processing cycles executing code from a subset of its total software. Processor 305, in implementing the most common functionality of system 300, will spend an inordinate amount of time executing code from certain functional software routines. In the digital camera example, the high-use functional software routines are typically identified in the development phase of system 300 through the use of well known software statistical analysis tools. These high-use functional software routines (hereinafter high-use functions) are instantiated in RAM 315. The remaining majority of the software code is instantiated in ROM 310.

Consequently, since RAM 315 is accessed at least three times faster that ROM 310, system 300 runs much faster than a prior art embedded system running the entirety of its operating system code from ROM. The majority of RAM 315 is occupied by capture buffer 414, display buffer 415, and working memory 420. By using a relatively small portion of RAM 315 to run the uncompressed high-use functions 416, the speed of computer system 300 is greatly increased. The operation of patch manager 405 ensures high-use functions 416 work seamlessly with operating system 403. The operation of patch manager 405 is discussed in greater detail below.

Figure 5:
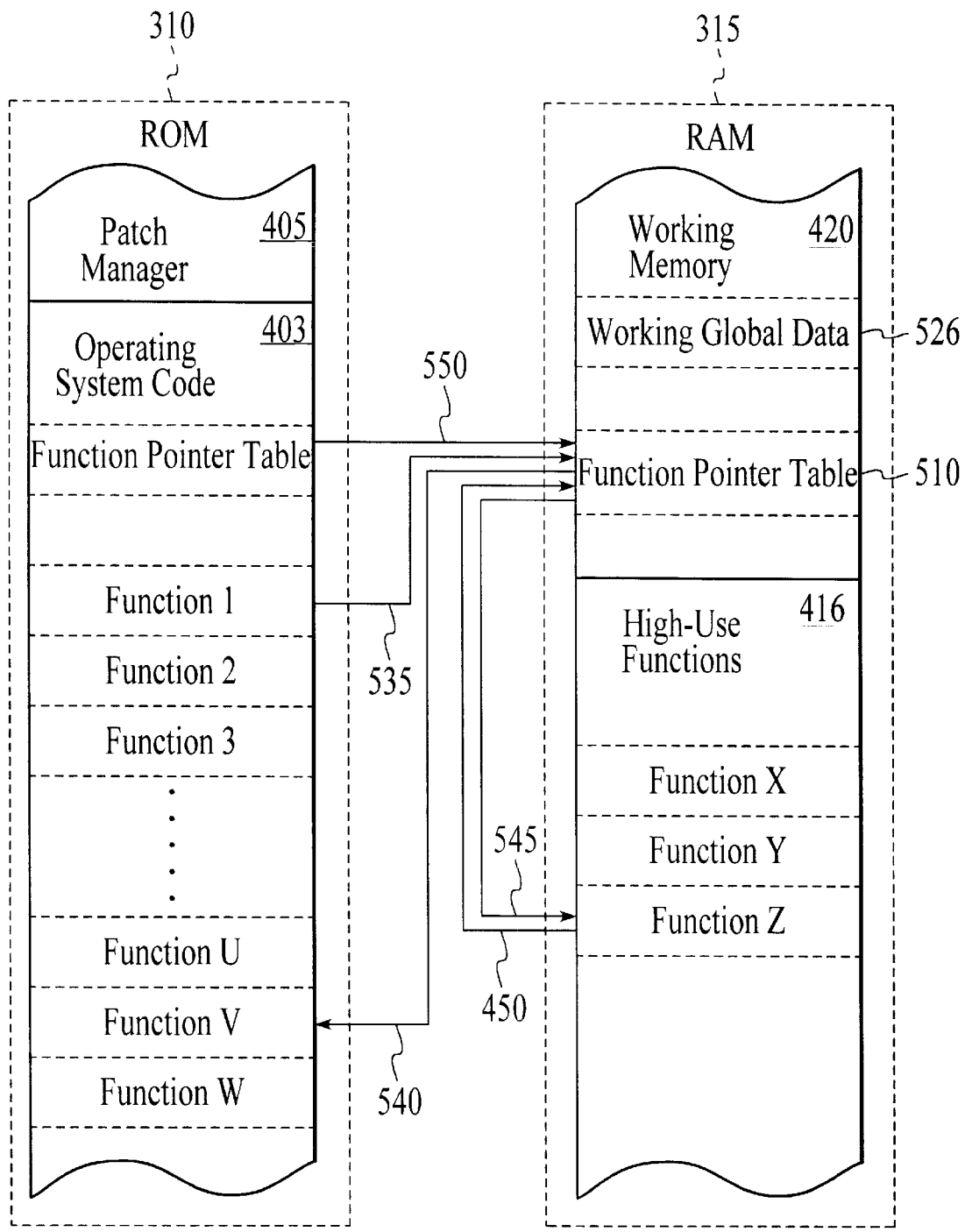
FIG. 5 shows a more detailed diagram of the contents of the ROM and the RAM in accordance with one embodiment of the present invention.

With reference now to FIG. 5, a more detailed diagram of the contents of ROM 310 and RAM 315 is shown. As shown in FIG. 310, ROM 310 includes operating system code 403, which in turn includes patch manager 405 and a plurality of functions, function 1 through function W. RAM 315 includes high-use functions 416, which in turn includes functions X through Z. RAM 315 also includes working memory 320, which in turn includes function pointer table 510 and other data structures used by operating system code 403 such as working global data 526.

As described above, the operation of patch manager 405 ensures high-use functions 416 work seamlessly with operating system 403. In the present embodiment, patch manager 405 copies a ROM version of function pointer table 510 from ROM 310 to RAM 315, as shown by line 550. It should be noted that, the function calls are implemented via address offsets from the function pointers of function pointer table 510. Function pointer table 510 includes a plurality of entries, or function pointers, which, when called by processing unit 305, redirect program execution to the memory address of a selected routine. The function pointers of function pointer table allow instantiated functions, whether executing from ROM 310 or RAM 315, to call one another. Initially, the function pointers are initialized to addresses in ROM 310, but after copying to RAM 315, the high-use function pointers are updated to addresses in RAM 315. Patch manager 405 then loads the decompressed high-use functions 416 into RAM 315 and updates function pointer table 510 with entries for high-use functions 416.

Once function pointer table 510 has been updated, the functions of operating system code 403 and the high-use functions can operate together as a fully-functional, software control program for embedded system 300. For example, in a case where function 1 needs to call function V, function 1 would access the function V function pointer within function pointer table 510, as indicated by arrow 535. The function V function pointer directs execution to the ROM address of function V, as indicated by arrow 540. On the other hand, in a case where function 1 needs to call function Z, a high-use function, the updated function Z function pointer would direct execution to that address, as indicated by arrow 545. Upon completion of the execution of function Z, execution is returned to the calling function, as indicated by arrow 450. It should be noted that function Z can alternatively call other functions via the function pointer table prior to returning control to its caller.

It should be noted that in addition to the capability of instantiating and linking high-use functions 416, patch manager 405 has the capability to instantiate and link other types of functions. Such functions include for example, those which extend the functionality of operating system code 403, those which replace or modify faulty or malfunctioning functions, and the like. Similarly, in addition to extending or modifying functions of operating system code 403, patch manager 405 can extend the functionality of any software application which executes on embedded system 300. The only limitation is that patch manager 417 cannot patch code which is executed prior to patch manager 417 in the start-up sequence, such as, for example boot code 401. For additional details and description of patch manager 405, readers are directed to co-pending U.S. Pat. No. 5,938,766. entitled "SYSTEM AND METHOD FOR EXTENDING FUNCTIONALITY OF A DIGITAL ELECTRONIC SYSTEM," filed Mar. 21, 1999, which is incorporated herein by reference.

Figure 6:
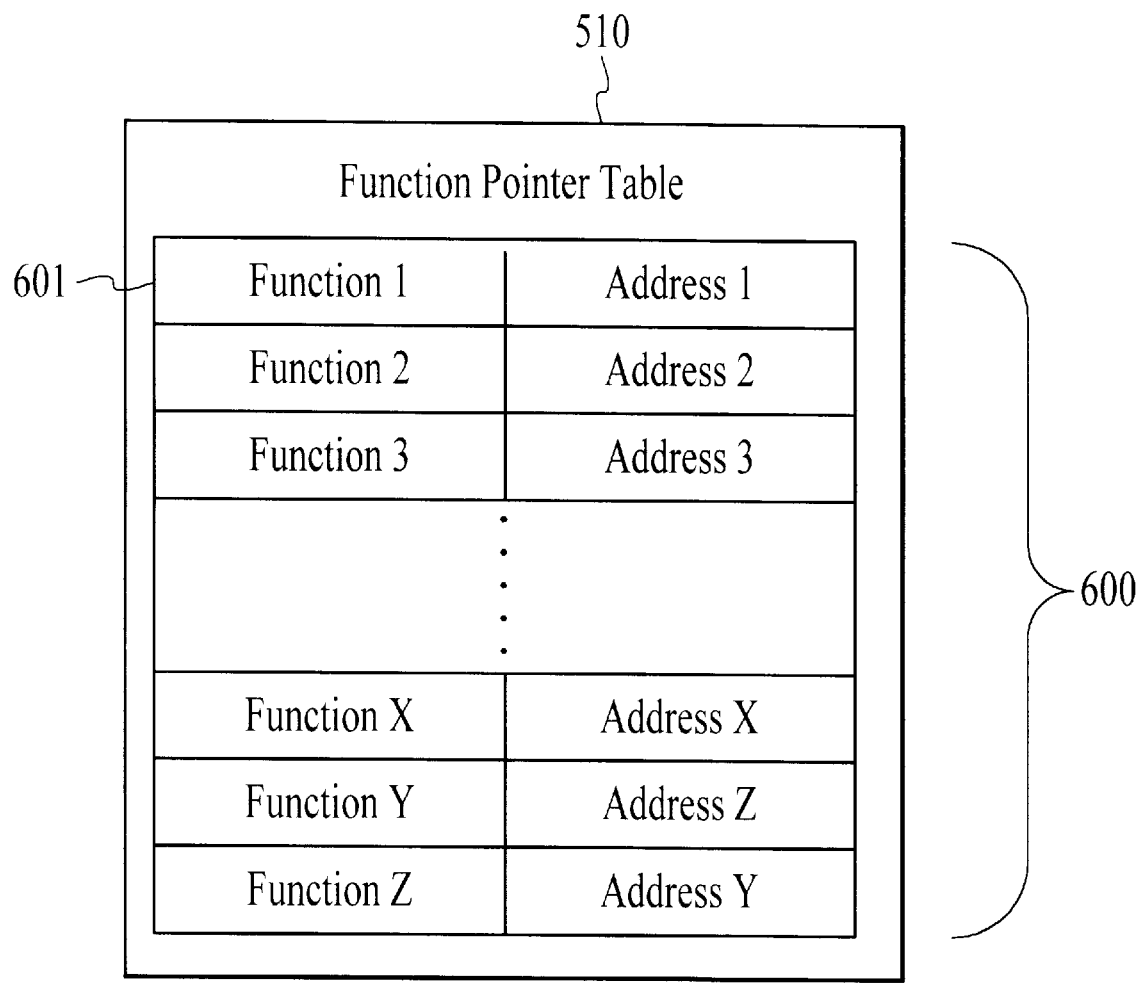
FIG. 6 shows a diagram of a function pointer table of the present invention in detail.

FIG. 6 shows a diagram of a function pointer table 510 in greater detail. As described above, function pointer table 510 includes a plurality of function pointers 600, each of which correspond to an instantiated function (e.g., function 1 of FIG. 5). Each function pointer includes a function identifier and that function's corresponding starting address. For example, function pointer 601 is the entry for function 1, and thus includes an identifier for function one (shown on the left side) and an address for function 1 (shown on the right side).

One alternate embodiment of function pointer table 510 would be to include only the address of the instantiated functions in the function pointer table and access them by indirection, wherein respective base addresses of the functions are stored in the table at the corresponding function number offset into the function pointer table. The function number operates as the offset into the function pointer table for a given function's address. The advantage of this embodiment is that the table size is reduced.

Figure 7:
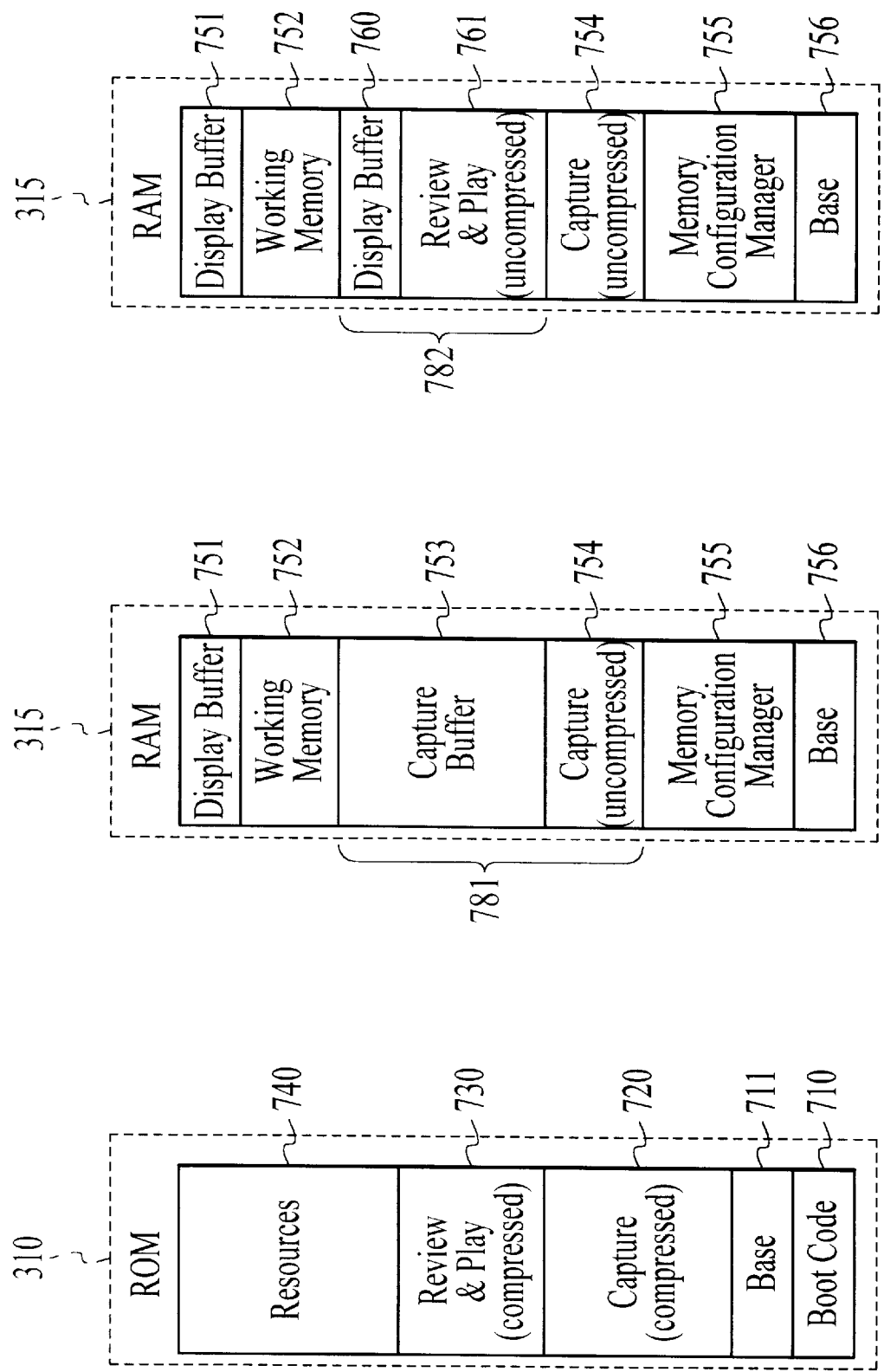
FIG. 7A shows a memory diagram of the contents of a ROM in accordance with an alternative embodiment of the present invention.
FIG. 7B shows a first memory diagram of the contents of a RAM in accordance with an alternative embodiment of the present invention.
FIG. 7C shows a second memory diagram of the contents of a RAM in accordance with an alternative embodiment of the present invention.

With reference now to FIGS. 7A, 7B, and 7C, memory diagrams showing the operation of a memory management system in accordance with a dynamic allocation embodiment of the present invention is shown.

In accordance with the dynamic allocation embodiment, rather than decompressing high-use functions from ROM 310 and instantiating them in RAM 315 at power up time, functions are decompressed and instantiated dynamically, as they are called by the operating system code or by the digital camera's user. In this embodiment, functions are delineated by their primary use as opposed to their relative amount of processor time. As the functional capability of one subset of software code is needed, that subset is decompressed out of ROM and instantiated in RAM. Subsequently, when the functionality of a different subset of software code is needed, the different subset is decompressed out of ROM and instantiated in RAM, overwriting the previous subset. In this manner, the valuable RAM address space is dynamically allocated to an immediately or imminently executing function, thereby maximizing the speed benefits of the limited RAM space, and minimizing the amount of expensive RAM required.

For example, FIGS. 7A and 7B show the contents of ROM 310 (e.g., 4 MB) and RAM 315 (e.g., 4 MB) in accordance with the dynamic allocation embodiment of the present invention. In this embodiment, ROM 310 includes boot code 710, base 711, compressed capture code 720, compressed review & play code 730, and resources 740. At power up time, boot code 710 executes and sets up the initial software operating environment of embedded system 300. Boot code 710 instantiates decompressed capture code 754, memory configuration manager 755, and base 756 within RAM 315. After boot and system instantiation is complete, application code uses an available block of memory within RAM 315 to use as a display buffer 751, working memory 752, and a capture buffer 753.

After initial power up, RAM 315 reflects a "capture mode" of the digital camera wherein the camera is immediately ready to capture images. In capture mode, a large amount of RAM is needed for the captured images. Thus, capture buffer 753 for storing captured images and display buffer 715 for the generating the camera's user display are instantiated in RAM 315. Resources 740, which includes fonts, symbols, sounds, icons, and the like, remains instantiated in ROM 310.

Memory configuration manager 755, in a manner similar to patch manager 405, is responsible for dynamically decompressing and instantiating functions as needed. Function pointer table 510 (shown in FIG. 6) is located within working memory 752. Memory configuration manager updates function pointer table 510 to include entries for the functions of capture code 754.

FIG. 7C shows the contents of RAM 315 after the digital camera switches from capture mode to review & play mode. The review & play code allows the user to review or play back previously captured images. Once images are captured and processed (e.g., compressed and stored on removable memory 330) the large capture buffer is no longer needed. Thus, memory configuration manager dynamically decompresses the compressed review & play code 730 and instantiates it within the address space of RAM 315 previously occupied by capture buffer 753. Memory manager uses a remaining amount of RAM address space to instantiate a second display buffer 760. This is shown by bracket 781 and bracket 782. The two display buffers 751 and 761 allow the updating and drawing of the user display, which is more important in the review & play mode than in the capture mode. Memory configuration manager then dynamically updates function pointer table 510 with entries reflecting review & play code 751.

Prior to decompressing review & play code 751, function table entries for the functions of review & play code 751 contain a pointer to the address of a "not available" error function. This function should never be called but is provided to assist in debugging. These entries are updated to real function addresses when decompression is completed. Accordingly, switching back from review & play mode to capture mode entails the replacement of the review & play code function pointer table entries with entries for the "not available" error function.

Thus, in accordance with the dynamic allocation embodiment of the present invention, software for system 300 is executed from ROM 310 and from RAM 315 as memory configuration manager 755 dynamically decompresses functions from ROM 310, instantiates them as needed in RAM 315, and dynamically updates the function pointers of function pointer table 510.

Figure 8:
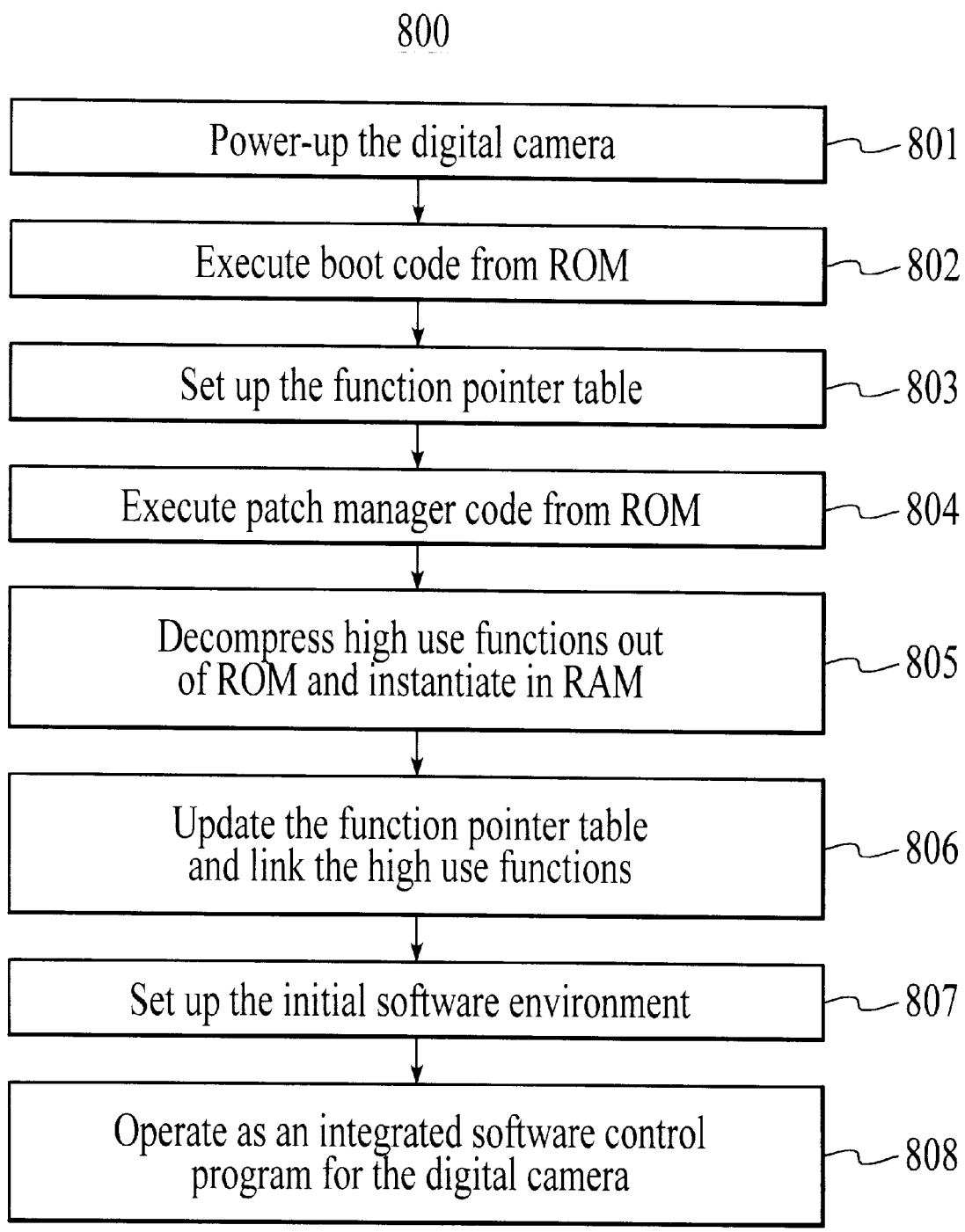
FIG. 8 shows a flow chart of the steps of a process in accordance with one embodiment of the present invention.

Referring now to FIG. 8, a flow chart of the steps of a process 800 in accordance with one embodiment of the present invention is shown. Process 800 shows the embodiment of the present invention in which a patch manager (e.g., patch manager 405 of FIG. 5) instantiates high-use functions after power up.

Process 800 begins in step 801 where a digital camera and its embedded system (e.g., system 300 from FIG. 3) is powered up, or switched on. At power up, in step 802, the processor of the embedded system (e.g., processor 305) begins executing boot code 401 stored in ROM 310. In step 803, boot code 401 sets up a function pointer table in RAM 315. In step 804, execution is then turned over to patch manager 405, which executes from address space in ROM 310. In step 805, patch manager 405 decompresses a set of high-use functions 402 and instantiates them in RAM 315. Then, in step 806, patch manager 405 updates the function pointer table 510 to include entries for high-use functions 402, and links the high-use functions 402 with the other functions instantiated in RAM 315 and ROM 310. In step 807, the initial software environment for embedded system 300 is set up by an application. For example, a first executed application (e.g., the default application code which executes after power-up) uses a block of available memory of RAM 315 for capture buffers, display buffers, working memory, and other software data structures which need to be instantiated in the writeable address space of RAM 314. Thus, in step 808, the high-use functions executing from RAM 315, functions of the operating system code 403 executing from ROM 310, and any other instantiated functions operate as an integrated software control program for the digital camera. In this embodiment, high-use functions are instantiated in RAM 315 after boot time using the capabilities of the patch manager 405.

Figure 9:
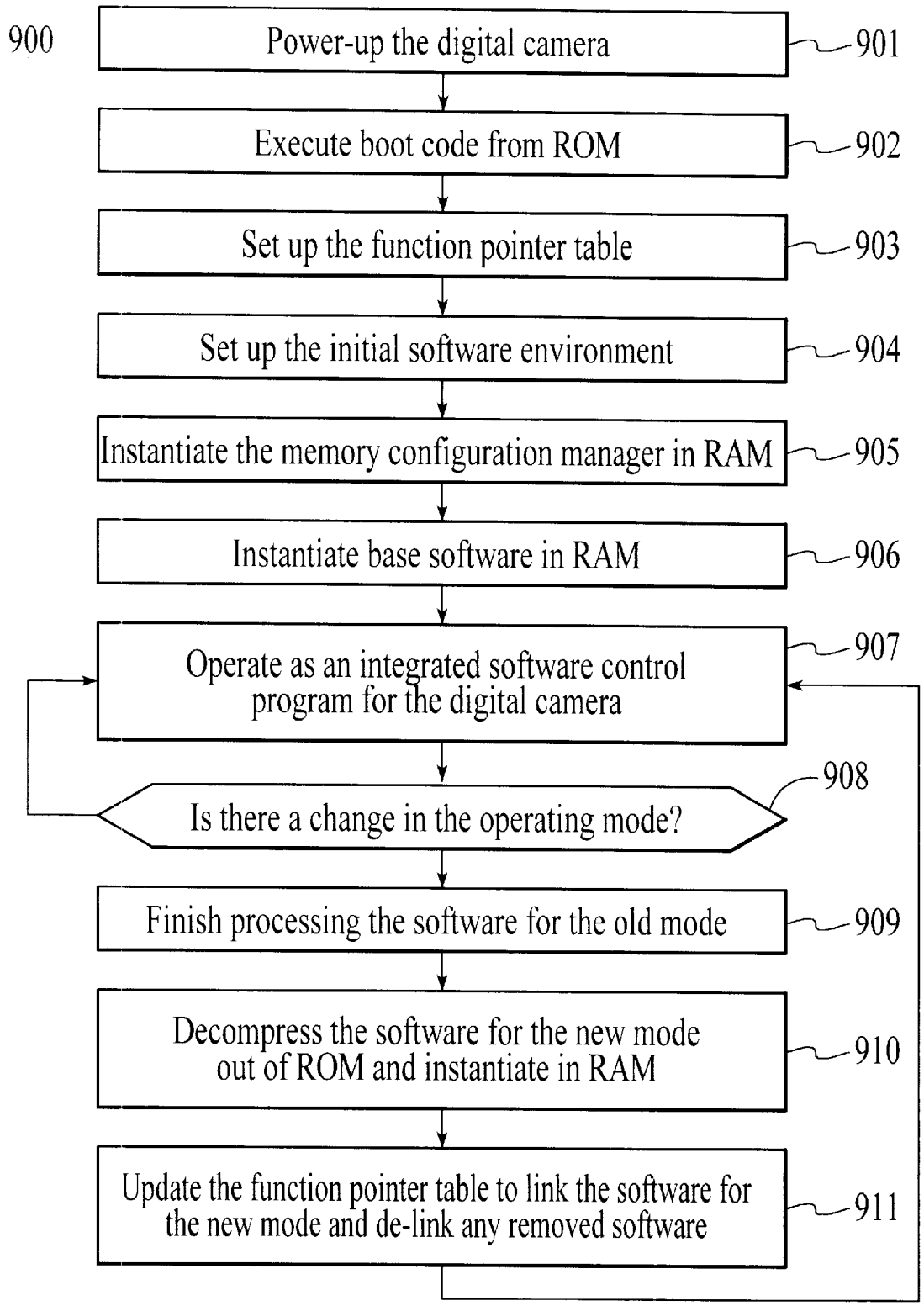
FIG. 9 shows a flow chart of the steps of a process in accordance an alternative embodiment of the present invention.

With reference now to FIG. 9, a flow chart of the steps of a process 900 in accordance with a dynamic allocation embodiment of the present invention is shown. Process 900 shows the steps of the dynamic allocation embodiment of the present invention in which a memory configuration manager (e.g., memory configuration manager 755 of FIG. 7B) decompresses, instantiates, and links functions dynamically during run time on an as-needed basis. As described above, in this embodiment, software is dynamically linked and de-linked as needed according to the requirements of the presently selected operating mode.

Process 900 begins in step 901 where a digital camera and its embedded computer system (e.g., computer system 300) is powered-up. In step 902, the processor of the embedded system (e.g., processor 305) executes boot code 710 stored in ROM 310. In steps 903 and 904, as described above, boot code 710 initializes the function pointer table 510 and sets up the initial software environment for embedded system 300. In step 905, the memory configuration manager 755 is decompressed out of ROM 310, instantiated, and linked. In step 906 the software for base 756 is instantiated within RAM 315 and linked. Thus, in step 907, the instantiated functions executing from ROM 310 and RAM 315 operate as an integrated software control program for the digital camera.

Referring still to FIG. 9, in step 908, process 900 continues normal operation until there is a change in the operating mode of the digital camera. It should be noted that this change can originate from a number of sources, such as, for example, the user selecting another mode via the digital camera's user interface, the camera entering a power saving mode due to inactivity, archive space in removable memory 330 being full, etc. As described above, if there is a change in operating mode, processing for the previous mode is completed in step 909 and memory configuration manager 755 dynamically decompresses the required functions from ROM 310 and instantiates them in RAM 315 in step 910. Depending upon the particular characteristics of the newly selected mode (e.g., the amount of software code comprising the mode, resource requirements of the mode, etc.), the functions for the newly selected mode are instantiated in available space within RAM 315 (e.g., address space previously used for buffers which are no longer needed). If more space is required, the software for the newly selected mode is instantiated over (e.g., written over) the software for the previous, no longer needed, mode. Then, in step 911, memory configuration manager 755 dynamically updates the function pointer table and links the required functions, enabling the new mode. If software for the new mode overwrites software for the previous mode, Memory configuration manager updates the function pointer table to de-link those functions which have been replaced (e.g., written over).

As described above, it should be noted that memory configuration manager 755 also updates the function pointer table with respective error pointer entries for those functions which, as a result of the mode change, are no longer instantiated. The digital camera then continues operation as an integrated software control program, in step 907, until a subsequent mode change occurs. Hence, in the dynamic allocation embodiment, required functions are dynamically decompressed, instantiated, linked, and de-linked by a memory configuration manager on an as-needed basis.

Figure 10A:
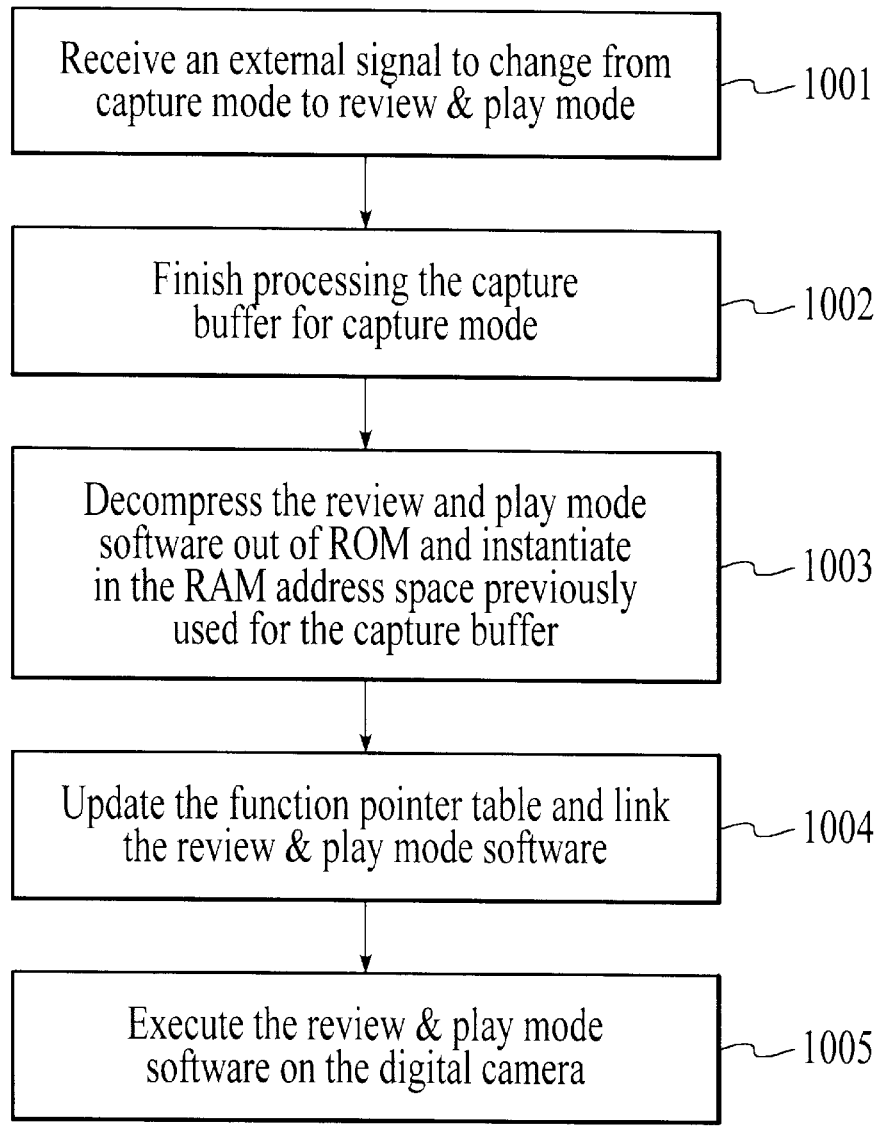
FIG. 10A shows a flow chart of the steps of a process in accordance with the present invention, wherein a digital camera switches from capture mode to review & play mode.
Figure 10B:
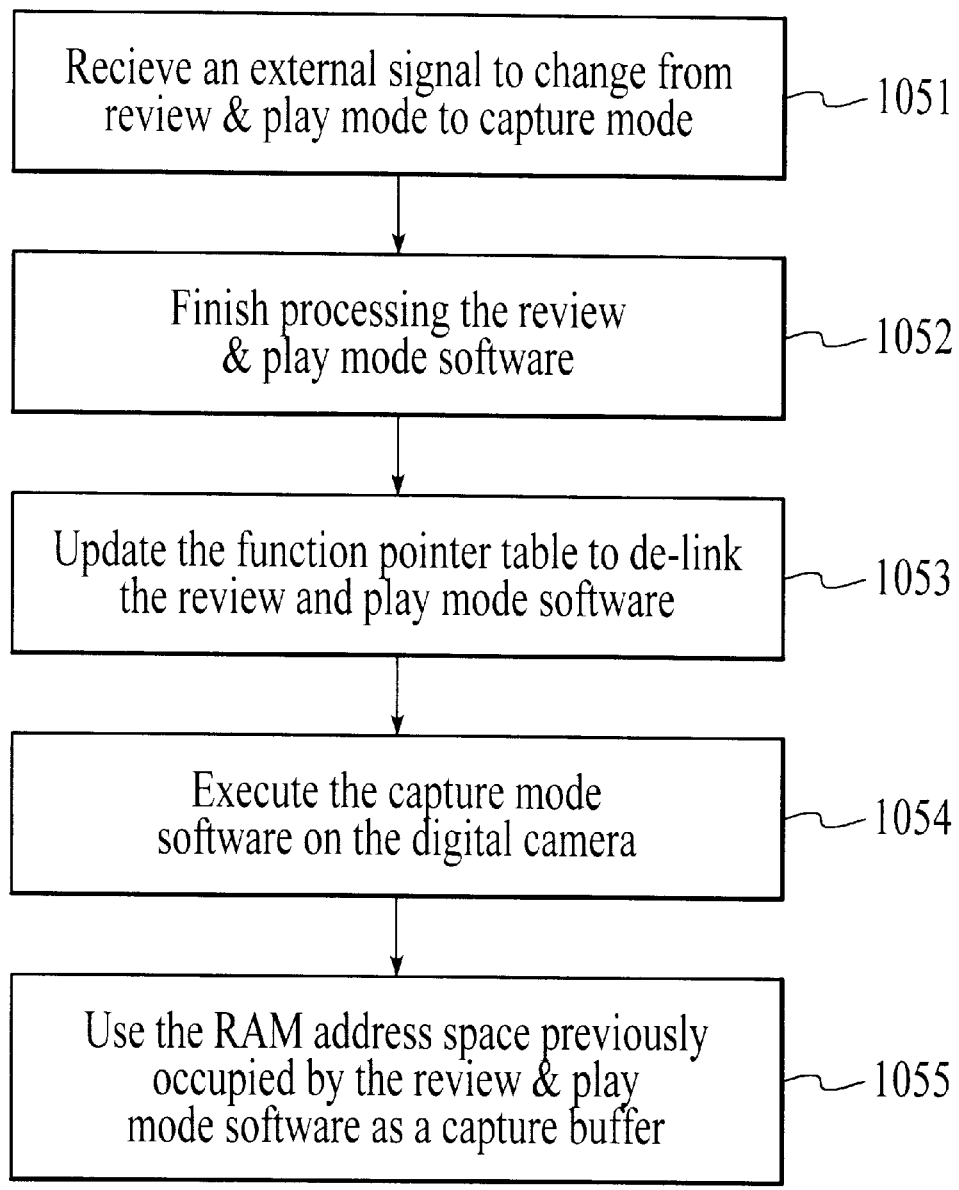
FIG. 10B shows a flow chart of the steps of a process in accordance with one embodiment of the present invention, wherein a digital camera switches from review & play mode to capture mode.

In FIGS. 10A and 10B, flow charts of the steps of a process 1000 and a process 1050 are respectively shown. Processes 1000 and 1050 are examples of the processes used by a digital camera to switch between two commonly used modes, in this case, capture mode and review & play mode. Where as process 900 of FIG. 9 shows the general steps used to switch from any one mode to another, process 1000 shows the particular steps involved in switching from capture mode to review & play, and process 1150 shows the particular steps involved in switching back to capture mode from review & play mode. Process 1000 and process 1050 both assume the general steps 901–907 have already been executed. Additionally, process 1000 assumes no de-linking of functions are required when instantiating review and play code 751.

Referring now to FIG. 10A, process 1000 begins with step 1001 where the embedded computer system receives an external signal to change from capture mode to review & play mode. In step 1002, any processing for capture mode is completed. Such processing could include, for example, the processing of a recently captured image stored in capture buffer 753. In step 1003, once processing for capture mode is complete, memory configuration manager 755 decompresses the review & play mode software out of ROM 310 and instantiates it in RAM 315. In this embodiment, review & play code 751 is loaded into the space previously used for capture buffer 753, allowing capture code 754 to remain instantiated even though its functions are not used in review & play mode. In step 1004 the function pointer table 510 is updated to link the review & play code 751, and in step 1005, review & play code 751 is executed on the digital camera.

FIG. 10B shows process 1050, where the digital camera switches from review & play mode back to capture mode. In step 1051, as described above, the embedded computer system receives an external signal to change from capture mode to review & play mode. In step 1052, any processing for review & play mode is completed, and in step 1053, memory configuration manager 755 updates function pointer table 510 is updated to de-link the review & play code 751. In step 1054, the capture code 754 is executed. Thus, in step 1055, the space in RAM 315 previously occupied by review & play code 751 is used as capture buffer 753.

Thus, the present invention provides a method and system for implementing complex functionality in a consumer electronics device inexpensively. The present invention provides a system which reduces the amount of expensive RAM needed in the embedded system of a device. Additionally, the system of the present invention maintains the speed and responsiveness of the device while reducing the amount of RAM used in the device. In comparison to prior art embedded system devices, a device in accordance with the present invention either uses less RAM and is, thus, less expensive, or runs faster using the same amount of RAM.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. In an embedded computer system including a processor coupled to a volatile memory and a non-volatile memory, a method for efficiently managing the contents of the volatile memory and the non-volatile memory to reduce the amount of non-volatile memory required, the volatile and non-volatile memories for containing computer readable software which when executed by the computer system cause the computer system to implement the method, the method comprising the steps of:

a) executing boot code at power-up of the embedded computer system, the boot code stored in the non-volatile memory;

b) instantiating a function pointer table in the volatile memory, wherein the function pointer table includes a plurality of entries for a corresponding plurality of instantiated functions, wherein at least one entry is for operating system code stored in the non-volatile memory;

c) decompressing a high-use function stored in the non-volatile memory;

d) instantiating the high-use function in the volatile memory;

e) updating the function pointer table using a patch manager to incorporate an entry for the high-use function;

f) executing the operating system code from the non-volatile memory; and g) executing the high-use function from the volatile memory, thereby reducing an amount of non-volatile memory required by the embedded computer system while maintaining operating speed of the embedded computer system.

2. The method of claim 1, wherein the non-volatile memory has a slower access time than the volatile memory, and wherein the non-volatile memory is ROM (read only memory) and the volatile memory is RAM (random access memory).

3. The method of claim 1, wherein the function pointer table is operable to enable any one of the plurality of instantiated functions to call another one of the plurality of functions.

4. The method of claim 1, wherein the patch manager includes software code operable to update the function pointer table to incorporate extension functions which extend the functionality of the operating system code.

5. The method of claim 1, wherein the embedded computer system is built into a hand-held digital camera.

6. The method of claim 1, wherein the processor of the embedded computer system expends a disproportionately large amount of execution time processing the high-use function in comparison to an amount of execution time the embedded computer system expends processing the plurality of instantiated functions.

7. A system for efficiently managing the contents of a volatile memory and a non-volatile memory to reduce the amount of non-volatile memory required in an embedded computer system, comprising an embedded computer system including a processor coupled to a volatile memory and a non-volatile memory, the volatile and non-volatile memories for containing computer readable software which when executed by the computer system cause the computer system to implement a method for efficiently managing the contents of the volatile memory and the non-volatile memory, the method comprising the steps of:

a) executing boot code at power-up of the embedded computer system, the boot code stored in the non-volatile memory;

b) instantiating a function pointer table in the volatile memory, wherein the function pointer table includes a plurality of entries for a corresponding plurality of instantiated functions, wherein at least one entry is for operating system code stored in the non-volatile memory;

c) decompressing a high-use function stored in the non-volatile memory;

d) instantiating the high-use function in the volatile memory;

e) updating the function pointer table using a patch manager to incorporate an entry for the high-use function;

f) executing the operating system code from the non-volatile memory; and g) executing the high-use function from the volatile memory, wherein the processor of the embedded computer system expends a disproportionately large amount of execution time processing the high-use function in comparison to an amount of execution time the embedded computer system expends processing the plurality of instantiated functions, thereby reducing an amount of non-volatile memory required by the embedded computer system while maintaining operating speed of the embedded computer system.

8. The system of claim 7, wherein the embedded computer system is built into a hand-held digital camera.

9. The system of claim 7, wherein the non-volatile memory has a slower access time than the volatile memory, and wherein the non-volatile memory is ROM (read only memory) and the volatile memory is RAM (random access memory).

10. The system of claim 7, wherein the function pointer table is operable to enable any one of the plurality of instantiated functions to call another one of the plurality of functions.

11. The system of claim 7, wherein the patch manager includes software code operable to update the function pointer table to incorporate extension functions which extend the functionality of the operating system code.

12. In an embedded computer system including a processor coupled to a volatile memory and a non-volatile memory, a method for dynamic memory allocation to manage the contents of the volatile memory and the non-volatile memory to reduce the amount of non-volatile memory required by the embedded computer system, the volatile and non-volatile memories for containing computer readable software which when executed by the computer system cause the computer system to implement the method, the method comprising the steps of:

a) executing boot code at power-up of the embedded computer system, the boot code stored in the non-volatile memory;

b) instantiating a function pointer table in the volatile memory, wherein the function pointer table includes a plurality of entries for a corresponding plurality of instantiated functions, wherein at least one entry is for operating system code stored in the non-volatile memory;

c) decompressing a first mode function stored in the non-volatile memory;

d) instantiating the first mode function in the volatile memory;

e) incorporating an entry for the first mode function in the function pointer table;

f) executing the operating system code from the volatile memory; and g) executing the first mode function from the volatile memory; and h) in response to a change in the required capability of the embedded computer system:
  i) decompressing a second mode function stored in the non-volatile memory;
  j) instantiating the second mode function in the volatile memory; and
  k) dynamically incorporating an entry for the second mode function in the function pointer table, thereby reducing an amount of non-volatile memory required by the embedded computer system while maintaining operating speed of the embedded computer system by dynamically allocating address space of the volatile memory.

13. The method of claim 12, wherein the non-volatile memory has a slower access time than the volatile memory, and wherein the non-volatile memory is ROM (read only memory) and the volatile memory is RAM (random access memory).

14. The method of claim 12, wherein the change in the required capability of the embedded computer system results from a change an operating mode of the computer system from a first mode to a second mode in response to an external input.

15. The method of claim 12 wherein step k) is performed using a memory configuration manager adapted to dynamically update the function pointer table with entries for newly instantiated functions.

16. The method of claim 12, wherein the embedded computer system is built into a hand-held digital camera.

17. A dynamic memory allocation system for efficiently managing the contents of a volatile memory and a non-volatile memory to reduce the amount of non-volatile memory required in an embedded computer system, comprising:

an embedded computer system including a processor coupled to a volatile memory and a non-volatile memory, the volatile and non-volatile memories for containing computer readable software which when executed by the computer system cause the computer system to implement a method for efficiently managing the contents of the volatile memory and the non-volatile memory, the method comprising the steps of:

a) executing boot code at power-up of the embedded computer system, the boot code stored in the non-volatile memory;

b) instantiating a function pointer table in the volatile memory, wherein the function pointer table includes a plurality of entries for a corresponding plurality of instantiated functions, wherein at least one entry is for operating system code stored in the non-volatile memory;

c) decompressing a first mode function stored in the non-volatile memory;

d) instantiating the first mode function in the volatile memory;

e) incorporating an entry for the first mode function in the function pointer table;

f) executing the operating system code from the volatile memory; and g) executing the first mode function from the volatile memory; and h) in response to a change in the required capability of the embedded computer system:
  i) decompressing a second mode function stored in the non-volatile memory using a memory configuration manager;
  j) instantiating the second mode function in the volatile memory; and
  k) dynamically incorporating an entry for the second mode function in the function pointer table using the memory configuration manager, thereby reducing an amount of non-volatile memory required by the embedded computer system while maintaining operating speed of the embedded computer system by dynamically allocating address space of the volatile memory.

18. The method of claim 17, wherein the non-volatile memory has a slower access time than the volatile memory, and wherein the non-volatile memory is ROM (read only memory) and the volatile memory is RAM (random access memory).

19. The method of claim 17, wherein the change in the required capability of the embedded computer system results from a change an operating mode of the computer system from a first mode to a second mode in response to an external input.

20. The method of claim 17 wherein step k) is performed using a memory configuration manager adapted to dynamically update the function pointer table with entries for newly instantiated functions.

21. The method of claim 17, wherein the embedded computer system is built into a hand-held digital camera.

22. The method of claim 17, wherein the embedded computer system is built into a personal digital assistant device.

23. The method of claim 17, wherein the embedded computer system is built into a embedded communications device.

24. A dynamic memory allocation system for efficiently managing the contents of a volatile memory and a non-volatile memory to reduce the amount of non-volatile memory required in an embedded computer system, comprising:

an embedded computer system including a processor coupled to a volatile memory and a non-volatile memory, the volatile and non-volatile memories for containing computer readable software which when executed by the computer system cause the computer system to implement a method for efficiently managing the contents of the volatile memory and the non-volatile memory, the method comprising the steps of:

a) executing boot code at power-up of the embedded computer system, the boot code stored in the non-volatile memory;

b) instantiating a function pointer table in the volatile memory, wherein the function pointer table includes a plurality of entries for a corresponding plurality of instantiated functions, wherein at least one entry is for operating system code stored in the non-volatile memory;

c) decompressing a first mode function stored in the non-volatile memory;
d) instantiating the first mode function in the volatile memory;
e) incorporating an entry for the first mode function in the function pointer table;
f) executing the operating system code from the volatile memory; and
g) executing the first mode function from the volatile memory; and
h) in response to a change in the required capability of the embedded computer system;
  i) decompressing a second mode function stored in the non-volatile memory using a memory configuration manager;
  j) instantiating the second mode function in the volatile memory using the memory configuration manager;
  k) dynamically updating the function pointer table to de-link the first mode function; and
  k) dynamically incorporating an entry for the second mode function in the function pointer table using the memory configuration manager, thereby reducing an amount of non-volatile memory required by the embedded computer system while maintaining operating speed of the embedded computer system by dynamically allocating address space of the volatile memory.

25. The method of claim 24, wherein the non-volatile memory has a slower access time than the volatile memory, and wherein the non-volatile memory is ROM (read only memory) and the volatile memory is RAM (random access memory).

26. The method of claim 24, wherein the change in the required capability of the embedded computer system results from a change an operating mode of the computer system from a first mode to a second mode in response to an external input.

27. The method of claim 24 wherein the memory configuration manager is adapted to dynamically update the function pointer table to link newly instantiated functions and de-link previously instantiated functions.

* * * * *